United States Patent [19]

Blackledge, Jr. et al.

[11] Patent Number: 5,533,205
[45] Date of Patent: Jul. 2, 1996

[54] METHOD AND SYSTEM FOR EFFICIENT BUS ALLOCATION IN A MULTIMEDIA COMPUTER SYSTEM

[75] Inventors: John W. Blackledge, Jr., Boca Raton, Fla.; Bradly G. Frey, Austin, Tex.

[73] Assignee: International Business Machines Corporation, Armonk, N.Y.

[21] Appl. No.: 220,326

[22] Filed: Mar. 30, 1994

[51] Int. Cl.[6] ................................................ G06F 13/00
[52] U.S. Cl. .................... 395/297; 395/287; 395/292; 395/304
[58] Field of Search ........................... 395/325, 298, 395/297, 304, 287, 292

[56] References Cited

U.S. PATENT DOCUMENTS

| | | |
|---|---|---|
| 4,855,996 | 8/1989 | Douskalis . |
| 5,146,455 | 9/1992 | Goke et al. . |
| 5,195,185 | 3/1993 | Marenin ................................ 395/325 |
| 5,241,541 | 8/1993 | Farrell et al. . |
| 5,265,223 | 11/1993 | Brockmann et al. ................... 395/325 |
| 5,359,592 | 10/1994 | Corbalis et al. ......................... 370/17 |

Primary Examiner—Gopal C. Ray
Assistant Examiner—John Travis
Attorney, Agent, or Firm—Robert S. Babayi; Andrew J. Dillon

[57] ABSTRACT

A method and system for efficient bus allocation in a multimedia computer system which includes a processor, a memory and multiple input/output devices which are coupled together via a bus which has a maximum data transfer rate. The transfer of audio, video, or other time sensitive data within the computer system to various presentation devices must be accomplished at certain predetermined rates in order to support selected applications. An arbitration level indicator which may be utilized to indicate a priority of bus access is associated with each presentation device which may contend for bus access. The bus access is then divided into a series of time frames which are subdivided into smaller time intervals. During selected time intervals the arbitration level indicators associated with a particular presentation devices are temporarily reordered to guarantee bus access at the required data rate.

6 Claims, 5 Drawing Sheets

METHOD AND SYSTEM FOR EFFICIENT BUS ALLOCATION IN A MULTIMEDIA COMPUTER SYSTEM

BACKGROUND OF THE INVENTION

1. Technical Field

The present invention relates in general to an improved multimedia computer system and in particular to an efficient method for bus allocation in a multimedia computer system. Still more particularly, the present invention relates to a bus allocation technique which guarantees bus access for a selected input/output device at a predetermined data rate.

2. Description of the Related Art

The interchange of data within a data processing system is a well known feature of modern state-of-the-art computer systems. Text and graphics data may be efficiently interchanged between the various subsystems within a computer system utilizing well known bus techniques; however, modern computer systems have begun to utilize so-called "multimedia" data. That is, presentations containing audio, video, text, graphics and image combined into a common presentation.

One common characteristic of multimedia data is that the data must be presented in a time domain sensitive manner which is acceptable to human sensory systems. For example, video data, in the form of full motion pictures, typically requires precisely timed updates at a rate of twenty-four to thirty frames of data per second within the video subsystem refresh memory. This information is typically stored within the computer system as compressed data and retrieved from a mass storage device or network connection. Similarly, audio data, even if stored in a compressed manner, must be presented at timed rates which are necessary to faithfully produce human speech, music or other audio in a manner which is acceptable to the human ear.

Thus, multimedia and other real time input/output devices in a personal computer system must receive and transmit data at guaranteed time intervals. Typically these devices are attached to a bus which is shared by other devices which may or may not have stringent time interval requirements. It is thus undesirable to have these time critical input/output devices gain control of the bus and transfer data while excluding all other devices from utilizing the bus until all data transfer for a time period is complete. Further, normal bus arbitration mechanisms employed within such computers typically do not include mechanisms to assure that these time critical data transfers are performed when required. This is particularly true when more than one time critical input/output device is coupled to a computer bus.

Thus, it should be apparent that a need exists for a method and system for efficient bus allocation in a multimedia computer system or other time sensitive data transfer systems which can be utilized to guarantee bus access for particular input/output devices at a predetermined data rate.

SUMMARY OF THE INVENTION

It is therefore one object of the present invention to provide an improved multimedia computer system.

It is another object of the present invention to provide an efficient method for bus allocation in a multimedia computer system.

It is yet another object of the present invention to provide a bus allocation technique which guarantees bus access for selected input/output devices at a predetermined data rate.

The foregoing objects are achieved as is now described. The method and system of the present invention may be utilized for efficient bus allocation in a multimedia computer system which includes a processor, a memory and multiple input/output devices which are coupled together via a bus which has a maximum data transfer rate. The transfer of audio, video, or other time sensitive data within the computer system to various presentation devices must be accomplished at certain predetermined rates in order to support selected applications. An arbitration level indicator which may be utilized to indicate a priority of bus access is associated with each presentation device which may contend for bus access. The bus access is then divided into a series of time frames which are subdivided into smaller time intervals. During selected time intervals the arbitration level indicators associated with a particular presentation devices are temporarily reordered to guarantee bus access at the required data rate.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
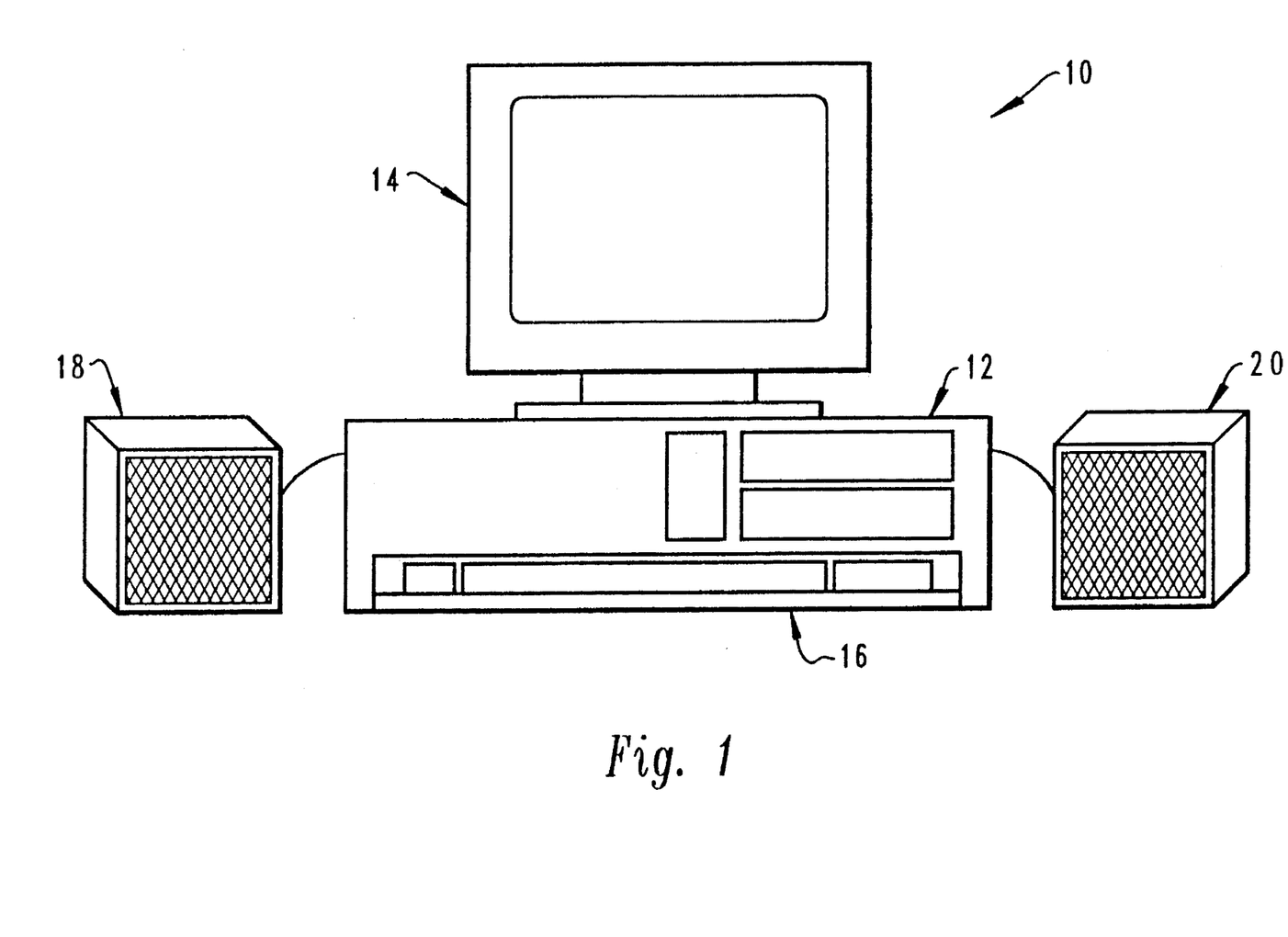
FIG. 1 is a pictorial representation of a multimedia computer system which may be utilized to implement the method and system of the present invention.

With reference now to the figures and in particular with reference to FIG. 1, there is depicted a pictorial representation of a multimedia computer system 10 which may be utilized to implement the method and system of the present invention. As illustrated, multimedia computer system 10 preferably includes a processor unit 12 and a display 14 which is capable of presenting video display data in the form of graphics, text or full motion video. A keyboard 16 is provided for receiving user inputs to multimedia computer system 10 and, multimedia computer system 10 preferably includes a pair of audio speakers 18 and 20. These speakers are typically coupled to an audio output adapter within processor unit 12 in a manner well known to those having ordinary skill in the art.

Figure 2:
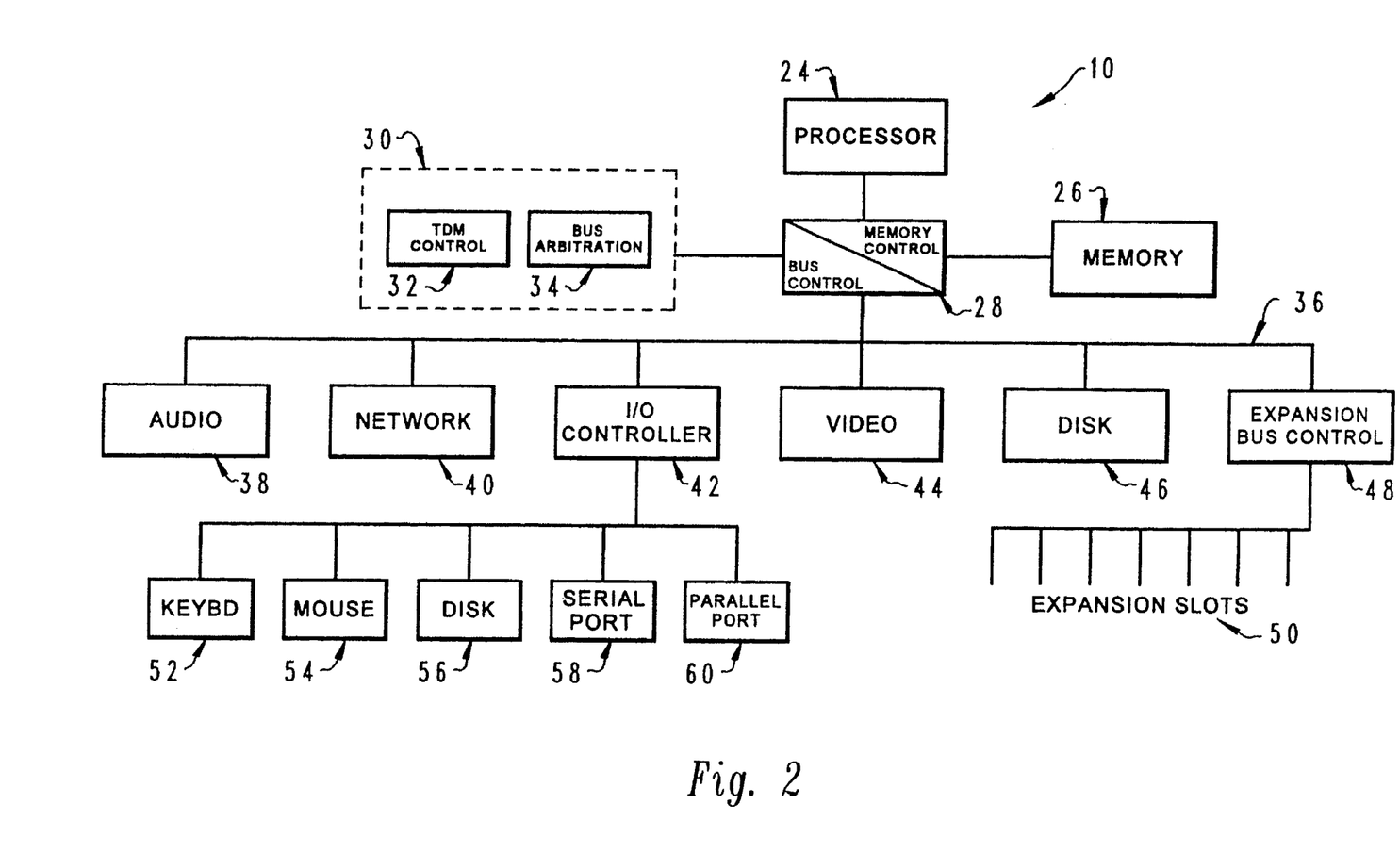
FIG. 2 is a high level block diagram of the multimedia computer system of FIG. 1.

Referring now to FIG. 2, there is depicted a high level block diagram of multimedia computer system 10 of FIG. 1. As illustrated, multimedia computer system 10 preferably includes a processor 24 which is coupled to memory 26 via memory control/bus control 28. These elements are then coupled to multiple input/output devices via bus 36 in a manner well known to those having ordinary skill in the art.

As illustrated within FIG. 2, multimedia computer system 10 preferably includes multiple diverse types of input/output devices including an audio presentation device 38 and a video presentation device 44. Similarly, as is common in such devices, a network input/output port 40 is also coupled to bus 36, which permits processor 24 to transmit and receive data from a network.

As is also illustrated within FIG. 2 an expansion bus which includes multiple expansion slots 50 is also typically provided within a multimedia computer system, such as multimedia computer system 10. The transmission and reception of data to and from devices within these expansion slots is generally controlled via expansion bus control 48 in a manner which is well known in the art. Additionally, an external disk device 46 may also be coupled to processor 24 via bus 36 in the manner illustrated within FIG. 2.

Finally, an input/output controller 42 is coupled to bus 36 and is typically utilized to control various input/output devices, such as a keyboard 52, mouse 54, or disk device 56. A serial port 58 and parallel port 60 may also be provided utilizing input/output controller 42.

In view of the above, it should be apparent to those having ordinary skill in the art that it is not unlikely that one or more input/output devices may require data to be transmitted via bus 36 simultaneously. As discussed above, these requirements may include certain required data rates in order to provide a multimedia output which is consistent with human sensory requirements. In accordance with the method and system of the present invention, this is accomplished utilizing bus arbitration control unit 30 which includes both a time division multiplex control 32 and a bus arbitration control 34. In a manner which will be explained in greater detail herein, time division multiplex control 32 and bus arbitration control 34 are utilized to ensure bus access for selected input/output devices at a predetermined data rate.

Figure 3:
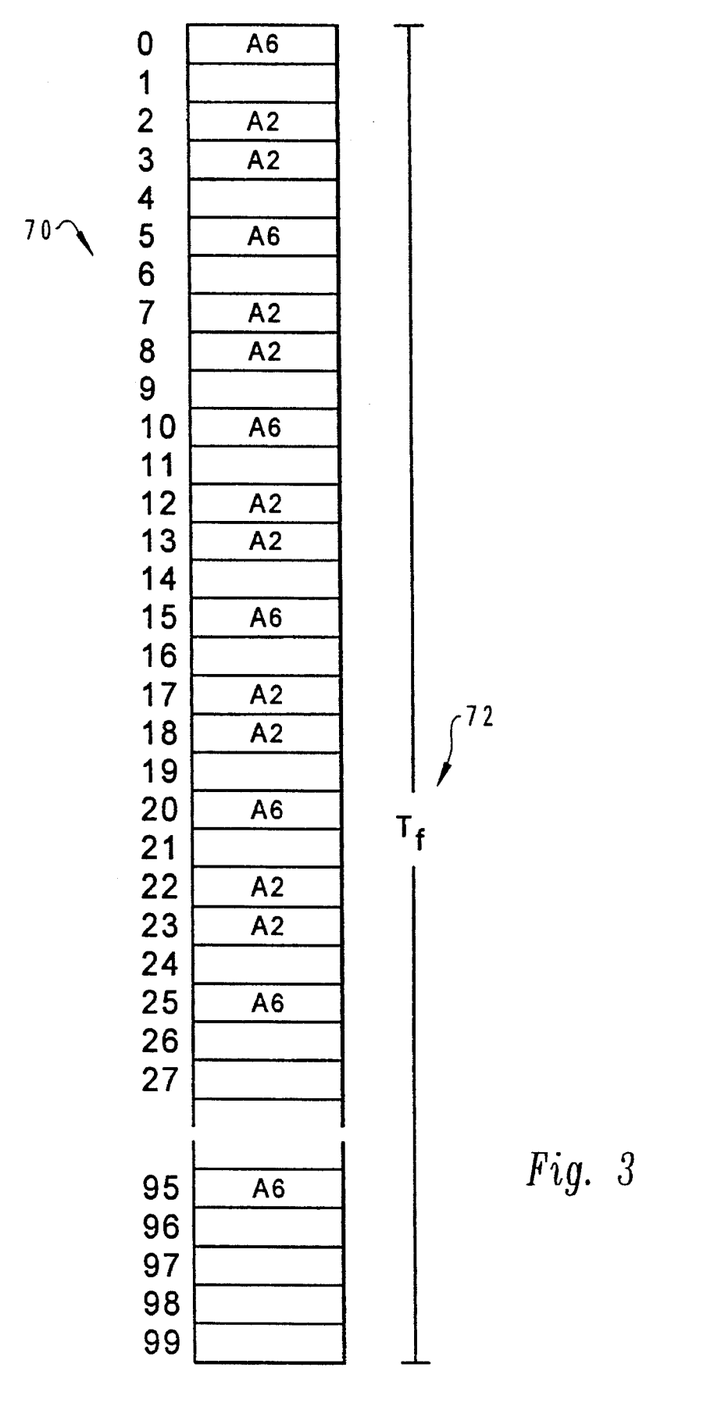
FIG. 3 is a pictorial representation of time interval allocation of arbitration level indicators in accordance with the method and system of the present invention.

With reference now to FIG. 3, there is depicted a pictorial representation of time interval allocation of arbitration level indicators in accordance with the method and system of the present invention. As illustrated within FIG. 3, access to bus 36 is preferably divided into a plurality of time frames, one of which is partially illustrated within FIG. 3. Each time frame represents a period of time $T_f$, as indicated at reference numeral 72. Each time frame is then further divided into a plurality of time intervals. In the depicted embodiment of the present invention one hundred time intervals are present within each time frame.

In the depicted embodiment of the present invention each time frame constitutes a predetermined period of time, for example one hundred microseconds, five hundred microseconds, etc. In the pictorial representation of FIG. 3, the time interval utilized for each frame is equal to five hundred microseconds and thus, by utilizing one hundred intervals per frame, each interval represents a five microsecond period. Thus, if the maximum data transfer rate for this bus is twenty megabytes per second and the particular input/output device assigned Arbitration Level 6 (A6) requires a data transfer rate of four megabytes per second, then every fifth interval within the frame will be allocated to that arbitration level. The device associated with Arbitration Level 6 (A6) can then burst twenty-five words (one hundred bytes) every twenty-five microseconds to achieve the required data rate. This device will also utilize every fifth interval within the frame between the 30th interval and the 90th interval; however, for purposes of illustration these intervals are not illustrated.

In this manner, the input/output device associated with Arbitration Level 6 (A6) utilizes twenty percent of the intervals within each frame and is thus guaranteed to receive data at a rate of twenty percent of the maximum data bus rate. Of course, those skilled in the art will appreciate that the percentage of bus bandwidth which is available for input/output devices will depend upon arbitration overhead and latency times; however, this example demonstrates a uniform distribution over time within each frame.

Also illustrated within FIG. 3 is an allocation of a portion of the bus access to an input/output device which is assigned Arbitration Level 2 (A2). This device utilizes ten percent of the allocated intervals within each frame to achieve a two megabyte data transfer rate. As illustrated within FIG. 3, the intervals assigned are in groups of two adjacent intervals and will comprise ten intervals out of each one hundred intervals. Thus, it should be apparent that the allocation of arbitration levels which are to be given priority within the various intervals of each frame may be distributed in a non-uniform or uniform manner.

Upon reference to FIG. 3, those skilled in the art will appreciate that it is simply a matter of storing within high speed memory an indication of which Arbitration Level is to be given the highest bus priority within a given interval within each frame of time on bus 36 (see FIG. 2). In this manner, bus access at a predetermined guaranteed data rate may be accomplished. The number of intervals within each frame which are assigned to a particular input/output device may be simply calculated based upon the maximum data rate available within the bus and the required data rate for a particular input/output device.

Figure 4:
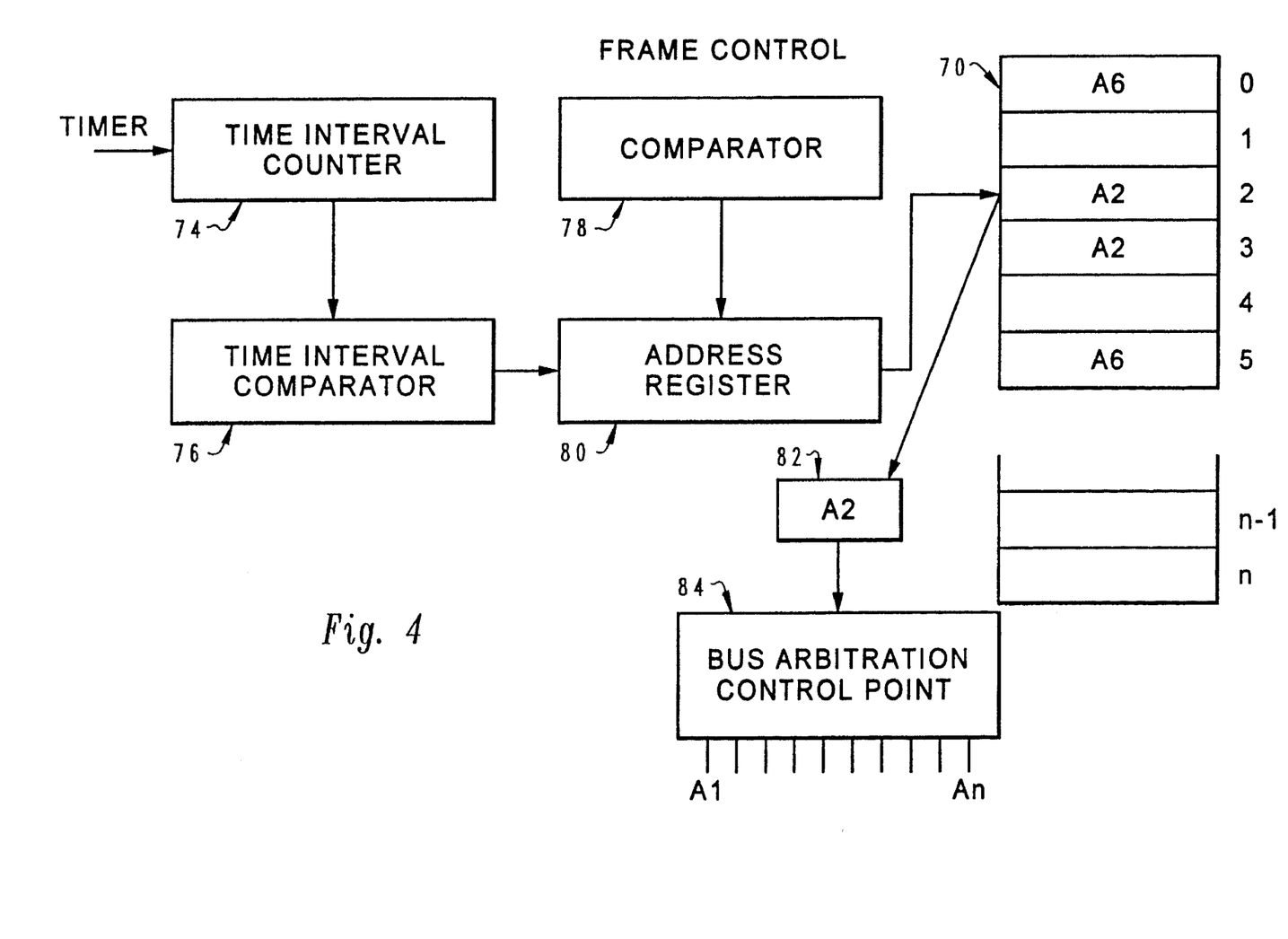
FIG. 4 is a high level block diagram of a bus allocation system provided in accordance with the method and system of the present invention.

Referring now to FIG. 4, there is depicted a high level block diagram of a bus allocation system which may be provided in accordance with the method and system of the present invention. As illustrated, an indication of which Arbitration Level is to be assigned the highest priority within a given interval within each time frame for the bus is stored within high speed memory 70. Thereafter, as illustrated within FIG. 4, a timer source is coupled to time interval counter 74. Time interval counter 74 is then utilized to determine which of the predetermined intervals within a frame is the current time interval. The output of time interval counter 74 is then coupled to time interval comparator 76 which, in conjunction with address register 80, is utilized to access a portion of high speed memory 70, which corresponds to the current time interval. The Arbitration Level stored within that location, if any, is then coupled via buffer 82 to bus arbitration control point 84.

Bus arbitration control point 84 assigns the bus access priority for each input/output device by assigning a particular priority for a selected Arbitration Level and for each subsequent arbitration level within the system. The priority of access assigned to subsequent arbitration levels may be assigned in any manner well known to those having ordinary skill in the art, such as a round-robin assignment.

Thus, for each interval within a time frame of access to the bus a particular Arbitration Level may be assigned as having the highest priority for bus access within that interval, thus guaranteeing access to the bus at a predetermined data rate for the device associated with that Arbitration Level. When the final interval within the frame has been checked to determine whether or not the Arbitration Levels should be reordered for that interval, frame control 78 indicates that the frame is completed and causes address register 80 to return to the first interval within the frame. In this manner, the method and system of the present invention provides a technique whereby bus access for a particular input/output device may be guaranteed at a predetermined rate.

Figure 5:
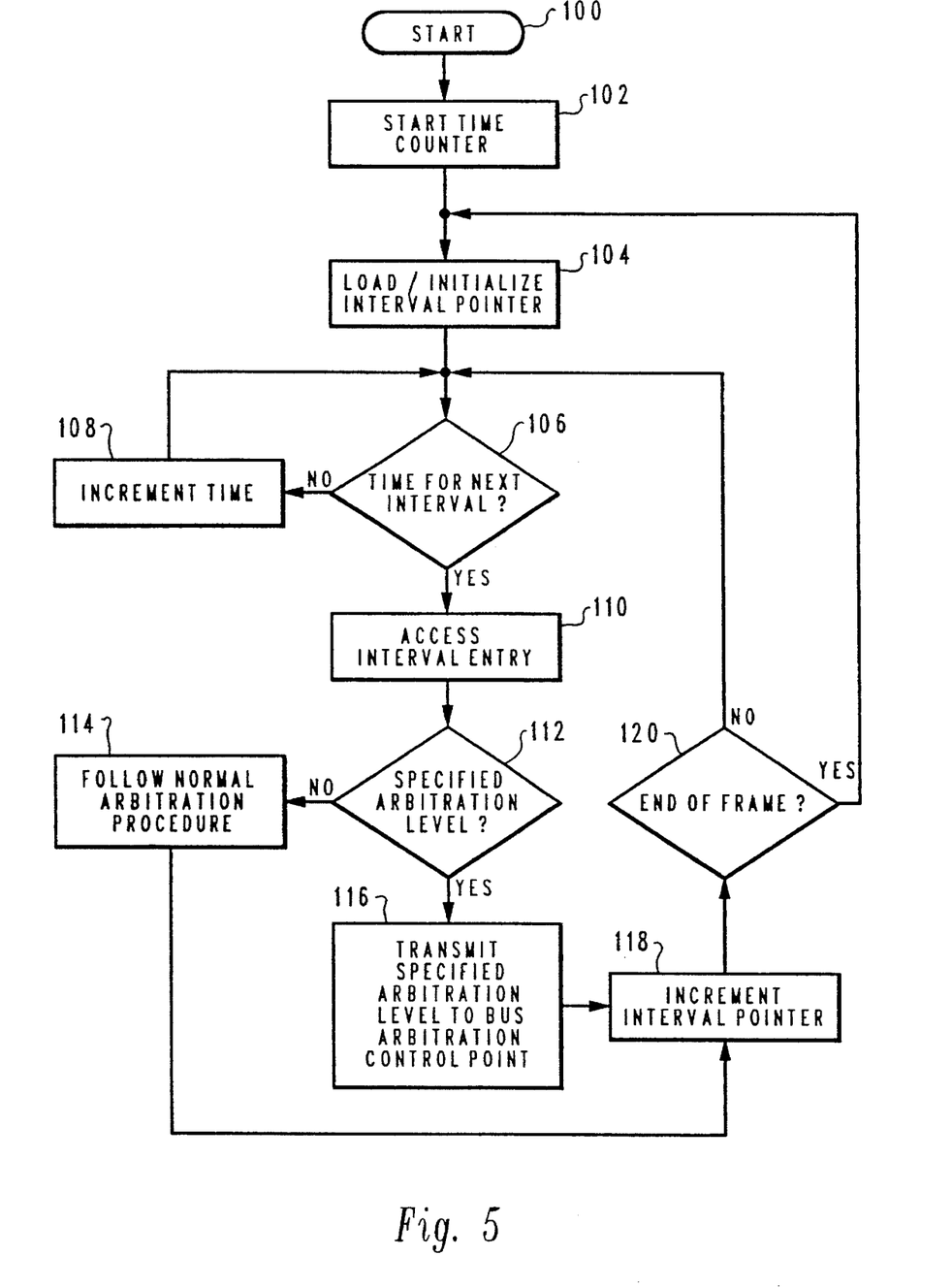
FIG. 5 is a high level logic flowchart illustrating a process for implementing the method and system of the present invention.

Finally, with reference to FIG. 5, there is illustrated a high level logic flowchart which depicts a process which may be utilized to implement the method and system of the present invention. As depicted, the process begins at block 100 and thereafter passes to block 102. Block 102 illustrates the starting of the time counter. Thereafter, the process passes to block 104. Block 104 illustrates the loading and initialization of the interval pointer (see FIG. 4).

Next, the process passes to block 106. Block 106 illustrates a determination of whether or not sufficient time has elapsed for the pointer to be moved to the next interval. If not, the process passes to block 108 and returns to block 108 in an iterative fashion to determine whether or not the time for the next interval has occurred.

Still referring to block 106 in the event the time for the next interval has occurred, the process passes to block 110. Block 110 illustrates the accessing of the entry within high speed memory 70 (see FIG. 4) associated with that interval. Thereafter, the process passes to block 112. Block 112 illustrates a determination of whether or not a specified Arbitration Level is listed in association with that interval. If not, the process passes to block 114 which depicts the following of normal arbitration procedures. Thereafter, the process passes to block 118, for continued processing in a manner which will be explained in greater detail below.

Referring again to block 112, in the event a specified Arbitration Level is associated with the current interval, the process passes to block 116. Block 116 illustrates the transmitting of the specified Arbitration Level listed within that interval to the bus arbitration control point. The bus arbitration control point, as described above, then reorders the Arbitration Levels utilized to determine bus access priority for that particular interval such that the specified Arbitration Level is given the highest priority for bus access during that interval. Thereafter, the process passes to block 118.

Block 118 illustrates the incrementing of the interval pointer. Thereafter, the process passes to block 120. Block 120 illustrates a determination of whether or not the interval pointer indicates that the last interval in the frame has been considered and if not, the process returns in an iterative fashion to block 106 to await the occurrence of the next interval. However, in the event the end of a frame has occurred, the process passes to block 104 which, as described above, depicts the loading and initialization of the interval pointer at the beginning of the next frame of time within the bus.

Upon reference to the foregoing those skilled in the art will appreciate that the Applicants herein have provided a technique whereby an ordered list of Arbitration Level indicators associated with particular input/output devices may be selectively and temporarily reordered during particular intervals of time in order to guarantee a particular input/output device access to the bus at a predetermined data rate. In this manner, the method and system of the present invention provides a technique whereby access to the bus at a predetermined data rate may be guaranteed without unduly restricting access to the bus by alternate devices.

While the invention has been particularly shown and described with reference to a preferred embodiment, it will be understood by those skilled in the art that various changes in form and detail may be made therein without departing from the spirit and scope of the invention.

We claim:

1. A method for efficient bus allocation in a computer system having a processor, a memory and a plurality of input/output devices coupled together via a bus having a maximum data transfer rate, said method comprising the computer implemented steps of:

associating an arbitration level indicator with each of said plurality of input/output devices within said computer system;

ordering said arbitration level indicators to indicate a priority of bus access for each associated input/output device;

dividing access to said bus into a plurality of consecutive time intervals; and selectively and temporarily reordering said arbitration level indicators within particular ones of said plurality of consecutive time intervals by:
 determining a required data transfer rate for a particular input/output device;
 calculating a first percentage of said maximum data transfer rate of said bus required to meet said required data transfer rate; and
 designating an arbitration level indicator associated with said particular input/output device as a highest priority for bus access during a first percentage of said plurality of consecutive time intervals;

wherein bus access for selected input/output devices may be guaranteed at predetermined fixed data rates.

2. The method for efficient bus allocation in a computer system according to claim 1, wherein said step of ordering said arbitration level indicator to indicate a priority of bus access for each associated input/output device comprises the step of numerically ordering said arbitration level indicators in a round-robin sequence to indicate a priority of bus access for each associated input/output device.

3. The method for efficient bus allocation in a computer system according to claim 1, wherein said step of dividing access to said bus into a plurality of consecutive time intervals comprises the steps of dividing access to said bus into a plurality of consecutive frames and dividing each frame into a plurality of consecutive time intervals.

4. A system for efficient bus allocation in a computer system having a processor, a memory, and a plurality of input/output devices coupled together via a bus having a maximum data transfer rate, said method comprising the computer implemented steps of:

means for associating an arbitration level indicator with each of said plurality of input/output devices within said computer system;

means for ordering said arbitration level indicators to indicate a priority of bus access for each associated input/output device;

means for dividing access to said bus into a plurality of consecutive time intervals; and means for selectively and temporarily reordering said arbitration level indicators within particular ones of said plurality of consecutive time intervals further comprising:

means for determining a required data transfer rate for a particular input/output device;

means for calculating a first percentage of said maximum data transfer rate of said bus required to meet said required data transfer rate; and means for designating an arbitration level indicator associated with said particular input/output device as a highest priority for bus access during a first percentage of said plurality of consecutive time intervals;

wherein bus access for selected input/output devices may be guaranteed at predetermined fixed data rates.

5. A system for efficient bus allocation in a computer system according to claim 4, wherein said means for ordering said arbitration level indicator to indicate a priority of bus access for each associated input/output device comprises means for numerically ordering said arbitration level indicators in a round-robin sequence to indicate a priority of bus access for each associated input/output device.

6. A system for efficient bus allocation in a computer system according to claim 4, wherein said means for dividing access to said bus into a plurality of consecutive time intervals comprises means for dividing access to said bus into a plurality of consecutive frames and dividing each frame into a plurality of consecutive time intervals.

* * * * *

UNITED STATES PATENT AND TRADEMARK OFFICE
CERTIFICATE OF CORRECTION

PATENT NO. : 5,533,205
DATED : July 2, 1996
INVENTOR(S) : *Blackledge, Jr. et al.*

It is certified that error appears in the above-indentified patent and that said Letters Patent is hereby corrected as shown below:

At Col. 6, line 53, please change "method" to --system--.

Signed and Sealed this

Ninth Day of December, 1997

Attest:

BRUCE LEHMAN

*Attesting Officer*     *Commissioner of Patents and Trademarks*